(12) United States Patent
Camenisch et al.

(10) Patent No.: US 8,051,010 B2
(45) Date of Patent: Nov. 1, 2011

(54) METHOD FOR AUTOMATICALLY VALIDATING A TRANSACTION, ELECTRONIC PAYMENT SYSTEM AND COMPUTER PROGRAM

(75) Inventors: Jan L. Camenisch, Thalwil (CH); Susan R. Hohenberger, Columbia, MD (US)

(73) Assignee: International Business Machines Corporation, Armonk, NY (US)

( * ) Notice: Subject to any disclaimer, the term of this patent is extended or adjusted under 35 U.S.C. 154(b) by 889 days.

(21) Appl. No.: 11/753,553

(22) Filed: May 24, 2007

(65) Prior Publication Data
US 2007/0294183 A1 Dec. 20, 2007

(51) Int. Cl.
*G06Q 20/00* (2006.01)
(52) U.S. Cl. ........ 705/69; 705/64; 705/65; 705/67; 713/180; 713/172; 713/173; 713/174; 726/1; 726/4; 726/5; 726/9
(58) Field of Classification Search ........ 705/64, 705/65, 67, 69; 713/180, 172, 173, 174; 726/1, 4, 5, 9
See application file for complete search history.

(56) References Cited

U.S. PATENT DOCUMENTS
2002/0004783 A1 * 1/2002 Paltenghe et al. .......... 705/41

FOREIGN PATENT DOCUMENTS
JP 2002279195 A * 9/2002

OTHER PUBLICATIONS
J. Camenisch, S. Hohenberger and A. Lysyanskaya, "Compact E-Cash", Eurocrypt vol. 3494 of LNCS, pp. 302-321, 2005. Retrieved from IDS.*
T. Okamoto and K. Ohta, "Disposable Zero-Knowledge Authentications and their Applications to Untraceable Electronic Cash", Crypto vol. 435 of LNCS, pp. 481-496, 1998.
M. Stadler, J.-M. Piveteau and J. Camenisch, "Fair Blind Signatures", Eurocrypt '95 vol. 921 of LNCS, pp. 209-219, 1995.
J. Camenisch, S. Hohenberger and A. Lysyanskaya, "Compact E-Cash", Eurocrypt vol. 3494 of LNCS, pp. 302-321, 2005.

* cited by examiner

*Primary Examiner* — James A Reagan
(74) *Attorney, Agent, or Firm* — Ido Tuchman; William J. Stock

(57) ABSTRACT

A method, system and computer program product relating to automatically validating a transaction between an issuer having a signing key, an emitter having an emitter key, an acceptor having a unique identity and a limit on transactions and a validator.

20 Claims, 5 Drawing Sheets

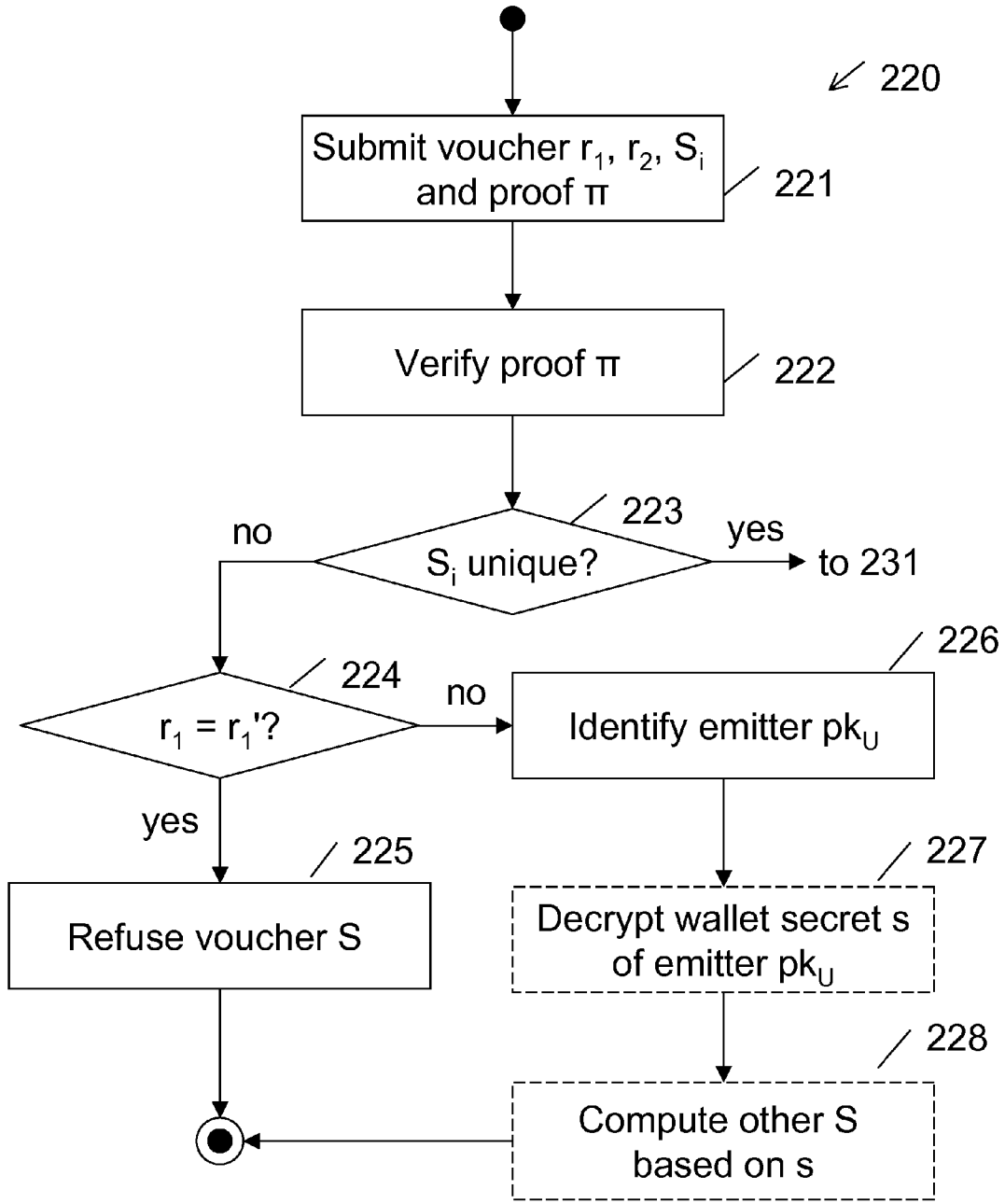

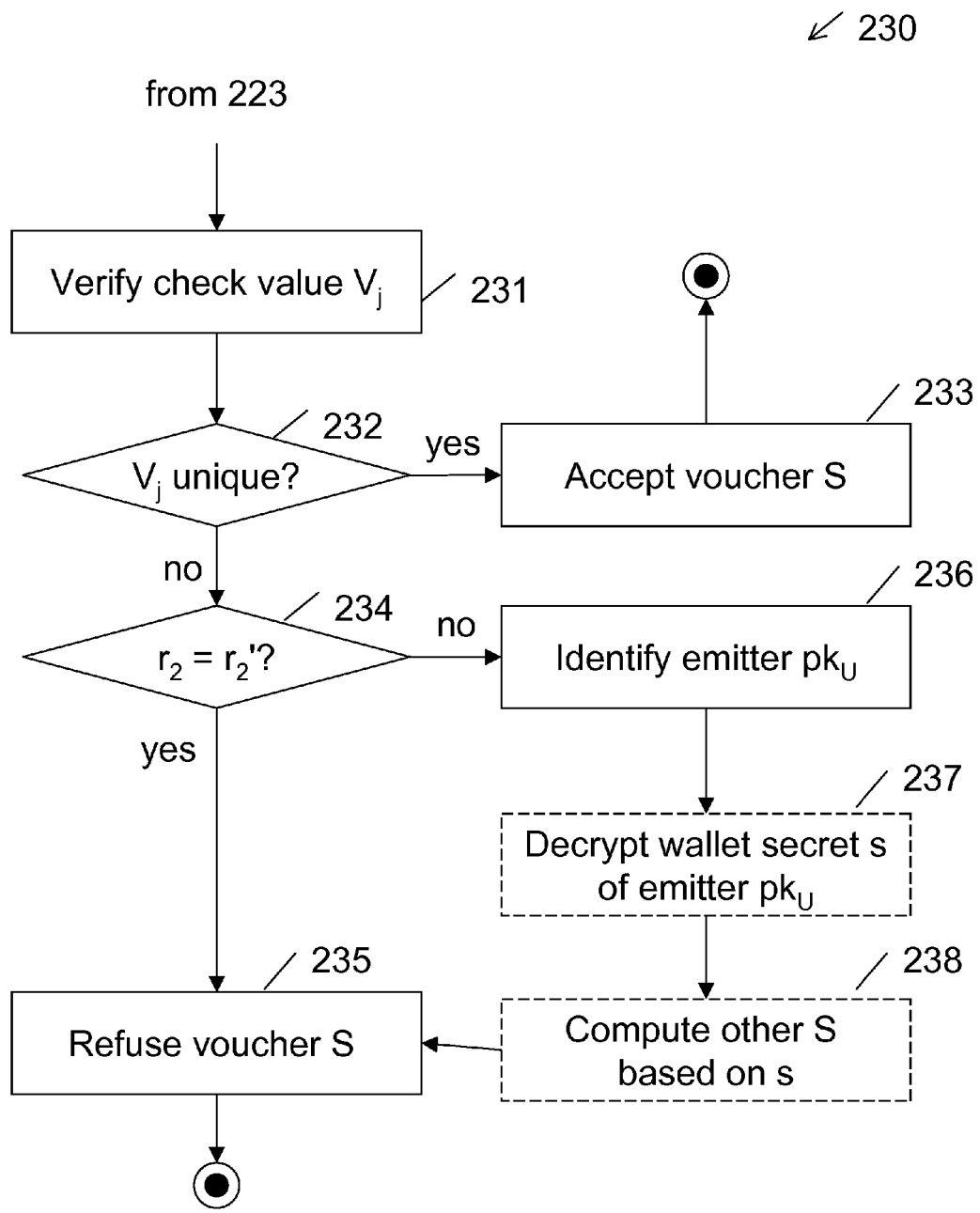

METHOD FOR AUTOMATICALLY VALIDATING A TRANSACTION, ELECTRONIC PAYMENT SYSTEM AND COMPUTER PROGRAM

CROSS-REFERENCE TO RELATED APPLICATIONS

This application claims priority under 35 U.S.C. §119 to European Patent Application No. 06010888.3 filed May 24, 2006, the entire text of which is specifically incorporated by reference herein.

BACKGROUND OF THE INVENTION

The present invention relates to a method for automatically validating a transaction between an issuer having a signing key, an emitter having an emitter key, an acceptor having a unique identity and a limit on transactions and a validator. The present invention further relates to an electronic payment system comprising a bank computer system, a user computer system, a merchant computer system and a validator computer system, a computer program and a computer program product.

Methods and systems for performing and validating transactions are faced with a variety of competing objectives. While on the one hand they should be provably correct and secure, such that no one participating in a transaction can gain an undue advantage, for example by assuming a false identity or willfully changing transaction values, on the other hand the identity of participants and their exact interaction should often remain anonymous. At the same time, operations to implement a transaction protocol should be computationally efficient and follow standard procedures.

Electronic payment systems for paying for goods and services on-line, in particular over the Internet, are a particular important example of electronic transaction systems. Without fast, secure, anonymous and easy-to-implement electronic payment systems, the growth of electronic commerce may be at risk. In consequence, several electronic payment systems have been developed by both researchers and financial institutions. One example of such a system is described in a paper by J. Camenisch, S. Hohenberger and A. Lysyanskaya titled "Compact E-Cash", published in EUROCRYPT, Vol. 3494 of LNCS, pages 302-321, 2005, which is herewith included by reference and referred to as CHL system. The CHL system is provably secure and anonymous, i.e. whilst coins cannot be reused within the system, a bank or coin issuer cannot recover the identity of a user or emitter, who spent the coin with a merchant or an acceptor when it is deposited with the bank again.

However, this and similar systems have one disadvantage: They are open to electronic money laundering. In various scenarios, a high number of transactions involving, representing, for example, high flows of cash between any two parties, should be detected, prevented or reported. Applications include the prevention of tax evasion, corruption and large-scale fraud, for example.

A system is described by M. Stadler, J.-M. Piveteau and J. Camenisch in a paper titled "Fair Blind Signatures" at EUROCRYPT '95, Vol. 921 of LNCS, pages 209-219, 1995, as having a trusted third party that can revoke anonymity of the users at any time to prevent money laundering. However, having a third party is a major drawback for an electronic payment system as users of the systems can never be sure, under what circumstances their anonymity may be revoked.

Other systems, for example an electronic payment system by T. Okamoto and K. Ohta described in a paper titled "Disposable Zero-Knowledge Authentications and their Applications to Untraceable Electronic Cash" in CRYPTO, Vol. 435 of LNCS, pages 481-496, 1990, offer users only a limited form of anonymity to prevent misuse. In this system, the coins of the user are anonymous but can be linked to one another. This severely restricts the anonymity of the electronic payment system.

Consequently, there exists a need for improved secure, anonymous transaction systems and methods. It is a particular challenge to devise an electronic payment system that can help to prevent electronic money laundering.

BRIEF SUMMARY OF THE INVENTION

According to one aspect of the invention, a method for automatically validating a transaction between an issuer having a signing key, an emitter having an emitter key, an acceptor having a unique identity and a limit on transactions, and a validator is provided. The method comprises the steps of:

withdrawing a voucher from the issuer by the emitter, the voucher being computed using a first two-party protocol between the issuer and the emitter based on the signing key of the issuer and the emitter key of the emitter, spending the voucher with the acceptor by the emitter, wherein a money laundering check value is computed using a second two-party protocol between the emitter and the acceptor based on the voucher, a transaction number between the emitter and the acceptor, a transaction challenge value generated by the acceptor and the unique identity of the acceptor, depositing the voucher, the transaction challenge value and the money laundering check value with the validator by the acceptor, and validating the transaction by the validator by verifying that the number of transactions between the emitter and the acceptor is below the limit on transactions of the acceptor by comparing the money laundering check value with money laundering check values already deposited with the validator in earlier transactions.

By verifying that the number of transactions between the emitter and the acceptor is below the limit on transactions of the acceptor, an unusually high number of transactions between any one emitter and acceptor can be detected.

According to an improved embodiment of the first aspect, in the step of spending, a proof of knowledge is computed by emitter and transmitted to the acceptor, in the step of depositing, the proof is deposited with the validator, and the step of validating further comprises the steps of verifying that the proof is valid with respect to the unique identity of the acceptor, the voucher and the money laundering check value. By computing and verifying a proof of knowledge, the integrity of the method can be enforced According to a further improved embodiment of the first aspect, in the step of validating, the validator verifies that the proof was computed based on the limit on transactions of the acceptor. By verifying that the proof was computed based on the limit on transactions of the acceptor, the validator can detect if the acceptor was trying to use a false limit on transactions during computation of the proof.

According to a further improved embodiment of the first aspect, if the validator detects that a money laundering check value deposited with the validator in an earlier transaction is equal to the money laundering check value of the current transaction, the step of validating further comprises the steps of rejecting the voucher, and retrieving a transaction challenge value and a voucher used in the earlier transaction, if the transaction challenge value used in the earlier transaction and the transaction challenge value are different, an identity of the emitter is computed by the validator based on the vouchers used in the earlier and current transaction. By verifying the money laundering check values and transaction challenge values with those of earlier transactions, parties trying to exceed the limit on transactions can be identified and punished.

According to a further improved embodiment of the first aspect, in the step of validating, the validator compares the voucher with a voucher deposited in an earlier transaction, and if the validator detects that a voucher deposited with the validator in an earlier transaction is equal to the voucher of the current transaction, the step of validating further comprises the steps of retrieving the transaction challenge value used in the earlier transaction, if the transaction challenge value used in the earlier transaction and the transaction challenge value are equal, the voucher is rejected by the validator, and, if the transaction challenge value used in the earlier transaction and the transaction challenge value are different, the an identity of the emitter is computed by the validator based on the vouchers used in the earlier and current transaction. By verifying the vouchers and transaction challenge values with those of earlier transactions, parties trying to overspend can be identified and punished.

According to a further improved embodiment of the first aspect, in the step of withdrawing, the emitter provides a proof of knowledge of a wallet secret to the issuer and the voucher is based on the wallet secret, in the step of spending, a wallet check value is computed and transferred to the acceptor, in the step of depositing, the wallet check value is deposited with the validator, and in the step of validating, based on wallet check values of the current and earlier transactions, the wallet secret of the emitter is computed by the validator, if the validator detects that the voucher or the money laundering check value have been deposited with the validator in an earlier transaction and the transaction challenge value of the current transaction is equal to the transaction challenge value used in the earlier transaction. By computing the wallet secret of the emitter in case it overspends or exceeds the limit of transactions, all its vouchers can be identified.

According to a further improved embodiment of the first aspect, in the step of spending, the acceptor verifies that the transaction number is below the limit on transactions and abandons the transaction, if the transaction number is above the limit on transactions. By verifying that the transaction number for a particular transaction is below the limit on transactions for the acceptor, the acceptor itself can prevent a transaction that exceeds its predetermined transaction limit.

According to a second aspect of the invention, an electronic payment system is disclosed. The electronic payment system comprises a bank computer system for issuing coins of a predetermined denomination, a user computer system for emitting the coins, a merchant computer system for accepting the coins and a validator computer system for validating the coins, the bank computer system, the user computer system, the merchant computer system and the validator computer system being operationally connected by a data network. The coins are withdrawn, emitted, deposited and validated according to a method in accordance with the first aspect. By providing an electronic payment system with a bank computer system, a user computer system, a merchant computer system and a validator computer system, transactions between these entities can be performed securely, anonymously and efficiently online, without introducing the risk of electronic money laundering.

According to a third and fourth aspect of the invention, a computer program and a computer program product are disclosed. They comprise program instructions executable by at least one processor of the computer system, and, upon execution of the program instructions by the at least one processor, all steps of the issuer, the emitter, the acceptor or the validator according to the first aspect of the invention are performed. By providing a computer program or a computer program product, the operations by the method according to the first aspect can be easily provided and distributed to computer systems.

BRIEF DESCRIPTION OF THE SEVERAL VIEWS OF THE DRAWINGS

The invention and its embodiments will be more fully appreciated by reference to the following detailed description of presently preferred but nonetheless illustrative embodiments in accordance with the present invention when taken in conjunction with the accompanying drawings.

The figures illustrate:

FIG. 2A to FIG. 2D show flow charts of a method in accordance with an embodiment of the present invention.

DETAILED DESCRIPTION OF THE INVENTION

Figure 1:
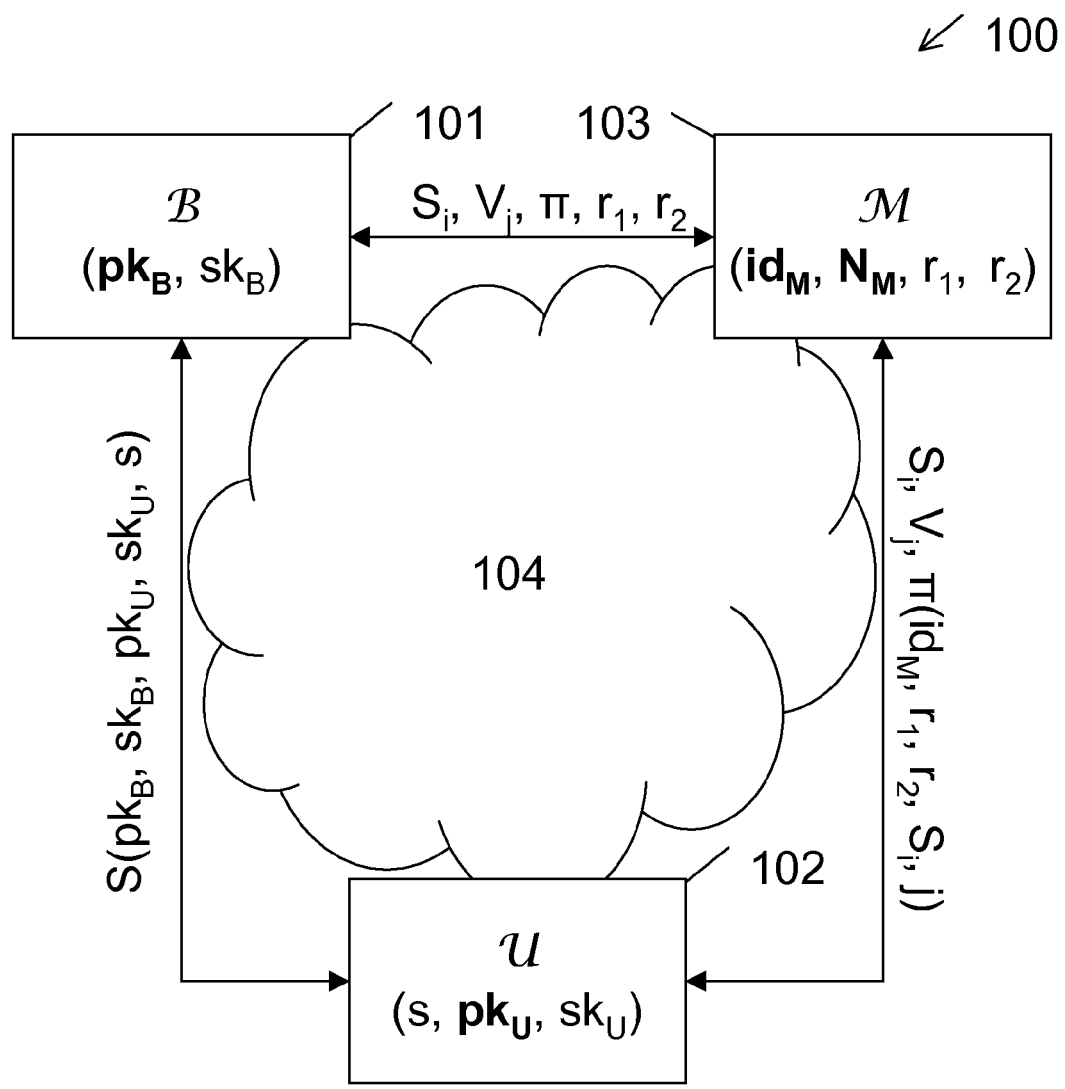
FIG. 1 shows an electronic payment system comprising a combined bank and validator computer system, a user computer system, and a merchant computer system in accordance with an embodiment of the present invention.

FIG. 1 shows the electronic payment system 100 comprising a combined bank and validator computer system 101, a user computer system 102, and a merchant computer system 103. The combined bank and validator computer system 101, the user computer system 102 and the merchant computer system 103 are connected by a data network 104.

The combined bank and validator computer system 101 belongs to a bank B, also referred to as issuer or validator in the following. Following conventions of electronic payment systems, it will be assumed that the combined bank and validator computer system 101 is responsible both for issuing and accepting coins of the electronic payment system 100. Consequently, only a single entity is shown in FIG. 1 and described in the following. However, it will be obvious to a person skilled in the art that both roles, i.e. the roles of issuing and validating coins described further below, can be performed by separate entities, i.e. a separate issuer and validator.

The bank B can issue coins of a predetermined denomination, also referred to as vouchers S in the following, to a user U, also referred to as emitter in the following, by means of a first two-party protocol between the combined bank and validator computer system 101 and the user computer system 102. In order to authenticate the vouchers S issued by the combined bank and validator computer system 101, the combined bank and validator computer system 101 comprises a signing key $(pk_B, sk_B)$. The signing key $(pk_B, sk_B)$ is a two-part asymmetric signing key of which the first part $pk_B$ is public and the second part $sk_B$ is secure or private.

The signing key $(pk_B, sk_B)$ is used by the combined bank and validator computer system 101 during the generation of the vouchers S. This can happen by using a signature algorithm to sign values provided by the user computer system 102. Alternatively, the signing key $(pk_B, sk_B)$ can be used as input of the combined bank and validator computer system 101 in a first two-party protocol to compute the vouchers S wherein the secure part $sk_B$ of the signing key $(pk_B, sk_B)$ is not revealed.

The user computer system 102 comprises an emitter key $(pk_U, sk_U)$ which is also a two-part key with a public part $pk_U$ and a secure part $sk_U$. In addition, the user computer system 102 comprises a wallet secret s that is used to generate serial numbers $S_i$ representing the vouchers S issued by the combined bank and validator computer system 101. Again, the private part of the emitter key $sk_U$, the wallet secret s, and derived serial numbers $S_i$ are not disclosed to the combined bank and validator computer system 101. Instead, the user computer system 102 only proves the knowledge of these and further parameters to the combined bank and validator computer system 101 in the first two-party protocol.

The merchant computer system 103 is identified by a unique identity $id_M$. In addition, the merchant computer system 103 is associated with a limit on transactions $N_M$, which is known to both the combined bank and validator computer system 101 and the user computer system 102. The limit on transactions $N_M$ may limit, for example, the number of transactions that are allowed to be performed between any single user computer system 102 and the merchant computer system 103 in a given context.

Depending on the nature of the voucher S, this may also represent a limit on the transaction value. For example, if each voucher S has a predetermined value of one Dollar, then, if the limit on transactions $N_M$ is set to 100, a user can only spend 100 Dollar with the merchant M associated with the merchant computer system 103. Other definitions of the limit on transactions $N_M$ and the vouchers S can be provided and used with the electronic payment system 100 or other voucher issuing and redeeming systems. In the electronic payment system 100, for example, there may exist vouchers S with different values, for example, vouchers having an associated value of 1 Cent, 10 Cent, 1 Dollar, 10 Dollar, and 100 Dollar. Equally, the limit on transactions $N_M$ may be valid for a single purchase, a fixed time period, for example one week, one month or one year, or may be valid for the entire life time of the voucher S, the signing key $(pk_B, sk_B)$, the emitter key $(pk_U, sk_U)$ or the unique identity $id_M$ of the merchant computer system 103.

In a second two-party protocol, the user computer system 102 proves to the merchant computer system 103 that it possesses a voucher S that was issued by the combined bank and validator computer system 101 before. For this purpose a proof $\pi$ is computed by the user computer system 102. In addition, the user computer system 102 computes a money laundering check value $V_j$ based on a challenge value $r_1$ generated by the merchant computer 103. The money laundering check value $V_j$ enforces that the limit on transactions $N_M$ between the merchant M and the user U is not exceeded.

Before the user computer system 102 engages in a transaction using the second two-party protocol with the merchant computer system 103, the user computer system 102 checks the number of transactions already performed with the merchant computer system 103. An honest user computer system 102 will not engage in a transaction if the limit on transactions $N_M$ is exceeded. Equally, the merchant computer system 103 will not engage in a transaction if the limit on transactions $N_M$ is exceeded. To enforce this honesty, underlying mathematical properties guarantee that the merchant computer system 103 can only generate as many different transactions challenge values $r_1$ for each public emitter key $pk_U$ as the limit on transactions $N_M$ allows. Consequently, neither party will allow more than the limited number of transactions $N_M$ to take place with a particular user computer system 102. If both the user computer system 102 and the merchant computer system 103 are dishonest, however, they are forced to reuse a transaction challenge value $r_1$ used previously in an earlier transaction or to generate a false proof $\pi$.

In a third two-party protocol, the merchant computer system 103 deposits the vouchers S obtained from the user computer system 102 with the combined bank and validator computer system 101. In addition to the voucher S, the merchant computer system 103 also deposits the transaction challenge value $r_1$, the money laundering check value $V_j$ and the proof $\pi$ computed in the second two-party protocol with the user computer system 102. The combined bank and validator computer system 101 then verifies that the proof $\pi$ is indeed valid with respect to the voucher S, the transaction challenge value $r_1$, the identity $id_M$ and the limit on transactions $N_M$ of the merchant computer system 103 trying to deposit the voucher S. In case the proof $\pi$ is invalid, it rejects the deposition. This means in particular that the value associated with the voucher S will not be credited to the merchant M.

In addition, the combined bank and validator computer system 101 checks whether the voucher S has been deposited in an earlier transaction. If this is the case, it will investigate the transaction challenge value $r_1$ in order to identify the violator. If it is detected, that an identical transaction challenge value $r_1'$ was used in the earlier transaction, the merchant M is to blame for trying to deposit the voucher S twice. Consequently the voucher S is refused, and, optionally, the identity $id_M$ of the merchant M may be published. If the transaction challenge values $r_1$ and $r_1'$ differ, the user U is to blame. In this case, based on the current and the previous transaction, the public part $pk_U$ of the user U can be determined. As a result, the combined bank and validator computer system 101 may uncover the identity of the fraudulent user computer system 102 or may uncover the wallet secret s associated with the emitter key $(pk_U, sk_U)$. In this case, the combined bank and validator computer system 101 can identify all vouchers S issued to the user computer system 102 and thus transactions involving it.

In a further step, the combined bank and validator computer system 101 also verifies that the limit of transactions has not been exceeded by comparing the money laundering check value $V_j$ with those of earlier transactions. If it detects that the merchant computer system 103 is trying to deposit a money laundering check value $V_j$ that has been deposited with the combined bank and validator computer system 101 before, it will also investigate the transaction challenge value $r_1$ in order to identify the violator or violators. If the earlier transaction is based on the same transaction challenge value $r_1$ as the current transaction, the merchant computer system 103 alone is to blame. Depending on the security settings of the electronic payment system 100, the combined bank and validator computer system 101 may either reject the deposition of the voucher S and/or publish the identity $id_M$ of the fraudulent merchant M. If it differs, the user computer system has also knowingly exceeded the limit on transaction $N_M$ and may be punished as described above.

The roles of the issuer and validator B, the emitter U and the acceptor M may be implemented in hard or software, for example by dedicated computer systems 101, 102 and 103 or software modules running on a all-purpose computer system 101, 102 and 103 or a combination thereof. A computer-readable medium may be comprised in the computer system 101, 102 or 103, embodying program instructions of a program executable by a processor comprised in the computer systems 101, 102 or 103, for example. The computer-readable medium may, for example, be a CD-ROM, a flash memory card, a hard disk, or any other suitable computer-readable medium.

FIG. 2A to FIG. 2D show flow charts of a method in accordance with an embodiment of the present invention.

Figure 2A:
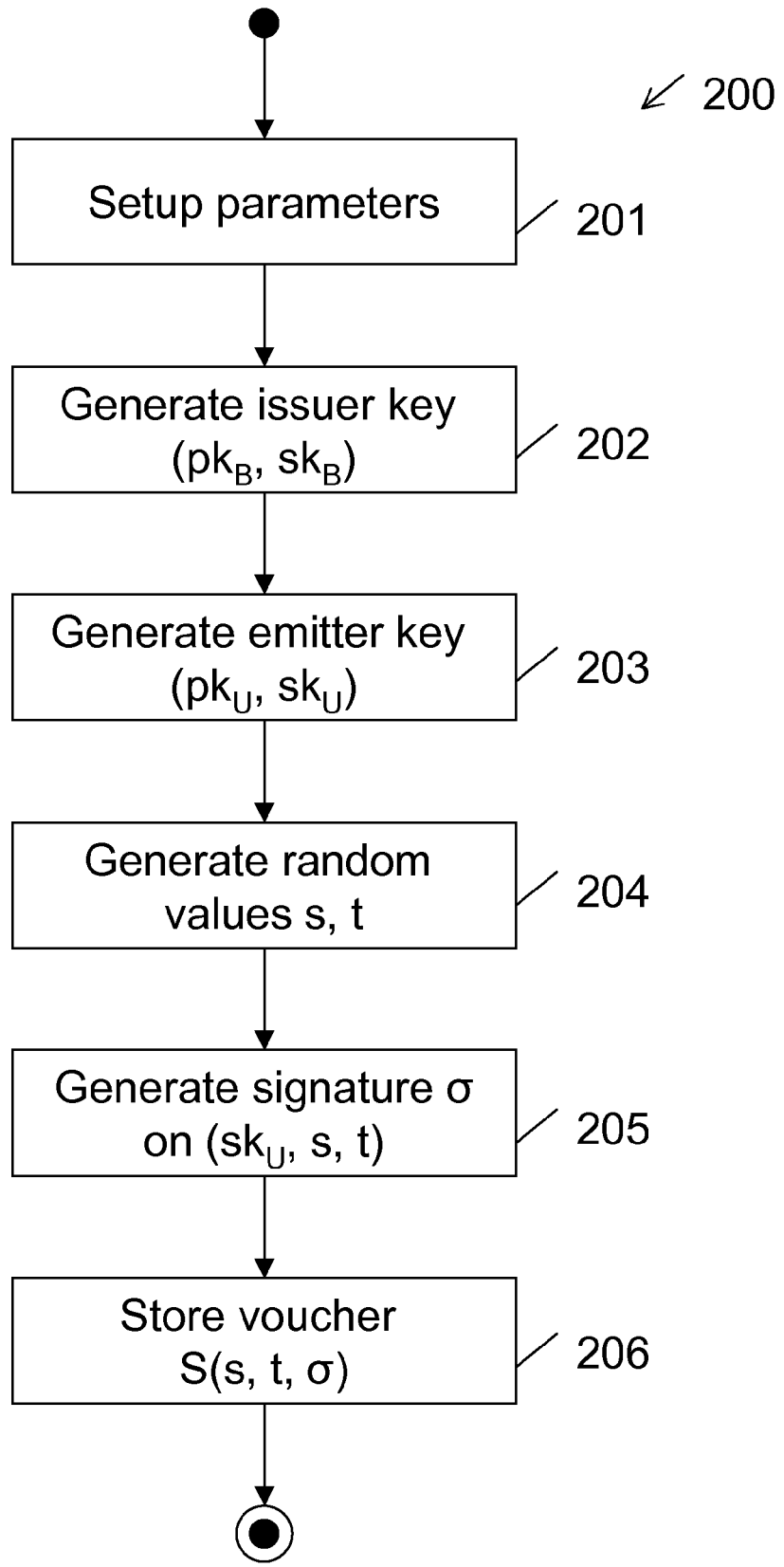

FIG. 2A shows a first two-party protocol 200 executed between the combined bank and validator computer system 101 and the user computer system 102. The first two-party protocol 200 serves to set up system parameters for carrying out a transaction in the electronic payment system 100 and for withdrawing coins from the combined bank and validator computer system 101 by the user computer system 102.

In a step 201, important system parameters of the electronic payment system 100 are set up. In particular, a security parameter k, a bilinear map e, a wallet size 1 and hash functions $H_1$ and $H_2$ on the bilinear map e are defined. These parameters set the system boundaries of how many vouchers S the user computer system 102 can store in its wallet.

In a step 202, the issuer B generates an asymmetric signing key ($pk_B$, $sk_B$) comprising a private part $pk_B$ and a secure part $sk_B$.

In a step 203, the emitter U also generates an asymmetric emitter key ($pk_U$, $sk_U$) comprising a public part $pk_B$ and a secure part $sk_U$ for the user computer system 102.

In a step 204, the user computer 102 generates a random value, in particular a wallet secret s, which is used to generate unique serial numbers $S_i$ for each vouchers S or coins to be withdrawn from the combined bank and validator computer system 101. The generated random value s is kept private by the user computer system 102.

In a step 205, the user computer system 102 proves knowledge of its secure key part $sk_U$ and the random values s and t to the combined bank and validator computer system 101. In addition, the user computer system 102 obtains a signature σ on its secure emitter key part $sk_U$, and the random value s. As a result, the combined bank and validator computer system 101 obtains a verifiable encryption of the wallet secret s with a user signature on this encryption. The combined bank and validator computer system 101 does not learn anything about the secure part of the emitter key $sk_U$ or the random value s.

In a step 206, the user computer system 102 stores the voucher S withdrawn from the combined bank and validator computer system 101. In practice an entire set of vouchers, comprising $2^l$ vouchers, may be withdrawn and stored together, each voucher S being represented by a serial numbers $S_i$. Vouchers can be stored, according to the CHL system, in a particular compact from of size O(l+k), where k is the security parameter of the system.

Figure 2B:
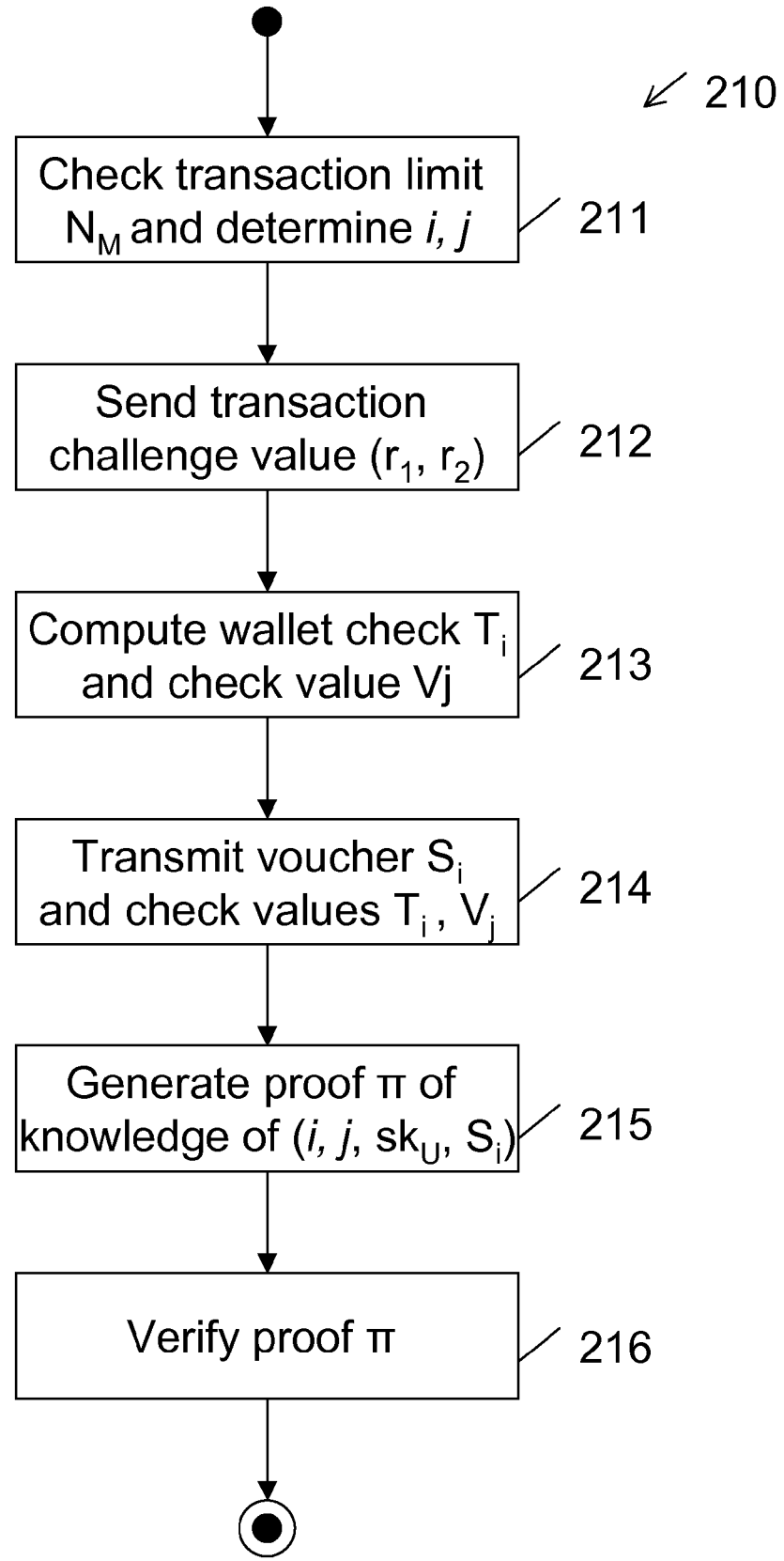

FIG. 2B shows a second two party protocol 210 to be executed between the user computer system 102 and the merchant computer system 103 for spending the voucher S issued to the user computer system 102.

In a step 211, the user computer system 102 checks its spending limit $N_M$ with a particular merchant computer system 103. An honest user computer system 102 will not engage in a transaction with a merchant computer system 103, if it has already reached the limit on transactions $N_M$. Based on this check the user computer system 102 also computes the number j of previous transactions between the user computer system 102 and the merchant computer system 103. The user computer system 102 also determines the index i of the serial number $S_i$ to be used for the current transaction, usually associated with the next unused voucher S. Equally, the merchant computer system 103 will determine, whether it is below the limit on transactions $N_M$ with the user computer system 102.

In a step 212, the merchant computer system 103 will generate a transaction challenge value, comprising, for example, random parameters $r_1$ and $r_2$. The transaction challenge values $r_1$ and $r_2$ are then transferred to the user computer system 102.

In a step 213, the user computer system 102 computes a wallet check value $T_i$ based on the voucher S with serial number $S_i$ and the transaction challenge value $r_1$ and $r_2$. The user computer system 102 also computes a money laundering check values V for the j-th transaction between the user computer system 102 and the merchant computer system 103.

In a step 214, the voucher S to be used is sent to the merchant computer system 103 by transmitting the i-th serial number $S_i$ and its associated check values $T_i$ and $V_j$ to the merchant computer system 103.

In a step 215, a proof π of knowledge of the values i, j, ski, s and σ is generated by the user computer system 102 for the merchant computer system 103. This proof π can be either performed interactively between the user computer system 102 and the merchant computer system 103 or non-interactively using the Fiat-Shamir heuristic.

In a step 216, the merchant computer system 103 verifies the proof π. If the proof π is valid with respect to the serial number $S_i$ used in the transaction, the merchant computer system 103 accepts the voucher S associated with the serial number $S_i$ and the proof π, for example for payment.

FIG. 2C shows a first part 220 of a validation procedure performed by the combined bank and validator computer system 101, which is used to determine, whether the voucher S has already been spent in an earlier transaction.

In a step 221, the merchant computer system 103 submits the voucher S comprising the transaction challenge values $r_1$ and $r_2$, the serial number $S_i$ of the voucher S, the check value $T_i$ and $V_j$ and the proof π. In this way, the merchant computer system 103 tries to redeem the value associated with the voucher S, for example by requesting to be credited by the combined bank and validator computer system 101 with an associated monetary value.

In a step 222, the combined bank and validator computer system 101 verifies that the proof π is valid with respect to the serial number $S_i$ and the transaction challenge values $r_1$ and $r_2$. If the proof π is not valid, the combined bank and validator computer system 101 refuses to accept the transaction at once.

In a step 223, the combined bank and validator computer system 101 verifies that the voucher S associated with the serial number $S_i$ has not been deposited with the combined bank and validator computer system 101 before.

If the voucher S has been deposited with the combined bank and validator computer system 101 before, in the step 224, a further check is performed, verifying whether the same transaction challenge value $r_1$ was used in the earlier transaction.

If this is the case, the merchant computer system 103 is trying to deposit the voucher S for the second time; consequently the combined bank and validator computer system 101 refuses the voucher in a step 225.

Otherwise, the user has double-spent and should be punished by the bank B. In this case, the combined bank and validator computer system 101 accepts the voucher from the merchant computer system 103 but identifies the user computer system 102 associated with the public key part $pk_U$ in a step 226.

In an optional step 227, depending on the security settings of the electronic payment system 100 used during the withdraw protocol shown in FIG. 2A, the combined bank and validator computer system 101 can compute the wallet secret s of the user computer system 102 based on the current transaction and the earlier transaction in which the same serial number $S_i$ was used.

Consequently, in a step 228, the combined bank and validator computer system 101 can identify all other serial numbers Si of vouchers S issued to the user computer system 102 based on the wallet secret s or the public user key $pk_U$.

If the serial number $S_i$ tested in step 223 was unique, the validation is continued in a second part 230 shown in FIG. 2D, which is used to verify that the current transaction does not exceed the limit on transactions $N_M$.

In a step 231, the money laundering check value $V_j$ computed for the transaction is verified. This is done by comparing the current money laundering check value $V_j$ with previous money laundering check values $V_j$ that have already been submitted to the combined bank and validator computer system 101 in earlier transactions in a step 232.

If the money laundering check value $V_j$ is unique, the combined bank and validator computer system 101 accepts the submitted voucher S in a step 233 and the method ends.

Otherwise, in a further step 234, the combined bank and validator computer system 101 verifies whether the same transaction challenge value $r_2$ was used in the current and earlier transaction.

If the same transaction value $r_2$ was used, only the merchant computer system 103 is to be blamed. In this case, in a step 235, the voucher is refused, such that the value associated with the transaction is not credited to the merchant computer system 103.

Otherwise, the user is also to blame. Consequently, in steps 236, 237 and 238 the identity of the user computer system 102 associated with the public key $pk_U$ is identified, its wallet secret s is decrypted and based on this information other serial numbers Si of vouchers S of this user are computed by the combined bank and validator computer system 101 as described above. In addition, the merchant M will also be punished by refusing the current voucher in step 235.

Due to the mathematical complexity of the underlying problem, the flowcharts presented in FIG. 2A to FIG. 2D can only present a high level overview of the information flow in the electronic payment system 100. The detailed operations taking place to implement the protocols between the combined bank and validator computer system 101, the user computer system 102 and the merchant computer system 103 are detailed in the following mathematical description.

Definition of Security

The definition of the CHL system is generalized to handle violations beyond double-spending. Our offline e-cash scenario consists of the three usual players: the user, the bank, and the merchant; together with the algorithms BKeygen, UKeygen, Withdraw, Spend, Deposit, {DetectViolation$^{(i)}$, IdentifyViolator$^{(i)}$, VerifyViolation$^{(i)}$}, Trace, and VerifyOwnership. Informally, BKeygen and UKeygen are the key generation algorithms for the bank and the user, respectively. A user interacts with the bank during Withdraw to obtain a wallet of $2^l$ coins; the bank stores optional tracing information in database D. In Spend, a user spends one coin from his wallet with a merchant; as a result the merchant obtains the serial number S of the coin, the merchant M record locator V of the coin, and a proof of validity $\pi$. In Deposit, whenever an honest merchant M accepted a coin $C=(S,V,\pi)$ from a user, there is a guarantee that the bank will accept this coin for deposit. The bank stores $C=(S,V,\pi)$ in database L. At this point, however, the bank needs to determine if C violates any of the system conditions.

For each violation i, a tuple of algorithms {DetectViolation$^{(i)}$, IdentifyViolator$^{(i)}$, VerifyViolation$^{(i)}$} is defined. Here, we have two violations.

Violation 1 (Double-spending): In DetectViolation$^{(1)}$, the bank tests if two coins, $C_1=(S_1,V_1,\pi_1)$ and $C_2=(S_2,V_2,\pi_2)$, in L have the same serial number $S_1=S_2$. If so, the bank runs the IdentifyViolator$^{(1)}$ algorithm on $(C_1,C_2)$ and obtains the public key pk of the violator and a proof of guilt $\pi$. Anyone can run VerifyViolation$^{(1)}$ on $(pk,S_1,V_1,\pi)$ to be convinced that the user with public key pk double-spent the coin with serial number $S_1$.

Violation 2 (Money-laundering): In DetectViolation$^{(2)}$, the bank tests if two coins, $C_1=(S_1,V_1,\pi_1)$ and $C_2=(S_2,V_2,\pi_2)$, in L have the same merchant record locator $V_1=V_2$. If so, the bank runs the IdentifyViolator$^{(2)}$ algorithm on $(C_1,C_2)$ and obtains the public key pk of the violator and a proof of guilt $\pi$. Anyone can run VerifyViolation$^{(2)}$ on $(pk,S_1,V_1,\pi)$ to be convinced that the user with public key pk exceeded the bounded-anonymity business limit with the coin with merchant record locator $V_1$.

Optionally, after any violation, the bank may also run the Trace algorithm on a valid proof of guilt $\pi$ to obtain a list of all serial numbers $S_i$ ever spent by the cheating user, with public key pk, along with a proof of ownership $\Gamma$. Anyone can run VerifyOwnership on $(pk,S_i,\Gamma)$ to be convinced that the user with public key pk was the owner of the coin with serial number $S_i$.

In addition, the security definition of the CHL system is generalized for e-cash. Its formalizations of correctness, balance, and anonymity of users remain unchanged. Roughly, balance guarantees that an honest bank will never have to accept for deposit more coins than users withdrew, while anonymity of users assures users that they remain completely anonymous unless they violate one of the known system conditions. In the following three additional properties are described. These properties are generalizations of CHL's identification and tracing of double-spenders, and their exculpability, to apply to any specified violation, in particular those above. Let params be the global parameters, including the number of coins per wallet and the spending limit for each merchant.

Identification of violators: Suppose an honest merchant (or possibly merchants) ran the Spend protocol with the adversary twice such that the output was $C_1=(S_1,V_1,\pi_1)$ and $C_2=(S_2, V_2,\pi_2)$. This property guarantees that, with high probability, if, for some i, DetectViolation$^{(i)}$(params, $C_1,C_2$) accepts, then IdentifyViolator$^{(i)}$(params,$C_1,C_2$) outputs a key pk and a proof $\pi$ such that VerifyViolation$^{(i)}$(params, pk,$S_1$, $V_1,\pi$) accepts.

Tracing of Violators: Suppose VerifyViolation$^{(i)}$(params, pk,S,V,$\pi$) accepts for some violation i derived from coins $C_1,C_2$. This property guarantees that, with high probability, Trace(params,pk,$C_1,C_2,\pi$,D) outputs the serial numbers $S_1,\ldots,S_m$ of all coins belonging to the user of pk along with proofs of ownership $\Gamma_1,\ldots,\Gamma_m$ such that for all j, VerifyOwnership(params,pk,$S_j,\Gamma_j$) accepts.

Exculpability: Suppose an adversary participates any number of times in the Withdraw protocol with an honest user with key pk, and subsequently to that, in any number of non-violation Spend protocols with the same user. The adversary then outputs an integer i, a coin serial number S, and a purported proof $\Gamma$ that the user with key pk committed violation i and owns coin S. The weak exculpability property states that, for all adversaries, the probability that VerifyO(params, pk,S,$\Gamma$) accepts is negligible.

Furthermore, the adversary may continue to engage the user in Spend protocols, forcing her to violate the system conditions. The adversary then outputs $(i,S,V,\pi)$. The strong exculpability property states that, for all adversaries: (1) when S is a coin serial number not belonging to the user of pk, weak exculpability holds, and (2) when the user of pk did not commit violation i, the probability that VerifyViolation$^{(i)}$ (params,pk,S,V,$\pi$) accepts is negligible.

Technical Preliminaries

The e-cash system uses a variety of known protocols as building blocks, which are now briefly reviewed. Many of these protocols can be shown secure under several different complexity assumptions, a flexibility that will extend to our e-cash systems. Notation: we write $G=\langle g \rangle$ to denote that g generates the group G.

Bilinear Maps

Let Bilinear_Setup be an algorithm that, on input the security parameter $1^k$, outputs the parameters for a bilinear mapping as $\gamma=(q,g_1,h_1,G_1, g_2, h_2, G_2, G_T, e)$. Each group $G_1=\langle g_1 \rangle=\langle h_1 \rangle$, $G_2=\langle g_2 \rangle=\langle h_2 \rangle$, and $G_T$ are of prime order $q=\Theta(2^k)$. The efficiently computable mapping $e:G_1 \times G_2 \rightarrow G_T$ is both: (Bilinear) for all $g_1 \in G_1$, $g_2 \in G_2$, and $a,b \in Z_q$, $e(g_1{}^a, g_2{}^b)=e(g_1,g_2)^{ab}$; and (Non-degenerate) if $g_1$ is a generator of $G_1$ and $g_2$ is a generator of $G_2$, then $e(g_1,g_2)$ generates $G_T$.

Complexity Assumptions

The security of our scheme relies on the same assumptions as CHL, which are:

Strong RSA Assumption: Given an RSA modulus n and a random element $g \in Z_n{}^*$, it is hard to compute $h \in Z_n{}^*$ and integer $e>1$ such that $h^e \equiv g \bmod n$. The modulus n is of a special form pq, where $p=2p'+1$ and $q=2q'+1$ are safe primes.

y-Decisional Diffie-Hellman Inversion Assumption (y-DDHI): Given a random generator $g \in G$, where G has prime order q, the values $(g, g^x, \ldots, g^{(x^y)})$ for a random $x \in Z_q$, and a value $R \in G$, it is hard to decide if $R=g^{1/x}$ or not.

External Diffie-Hellman Assumption (XDH): Suppose Bilinear_Setup($1^k$) produces the parameters for a bilinear mapping $e:G_1 \times G_2 \rightarrow G_T$. The XDH assumption states that the Decisional Diffie-Hellman (DDH) problem is hard in $G_1$. This implies that there does not exist an efficiently computable isomorphism $\psi':G_1 \rightarrow G_2$.

Sum-Free Decisional Diffie-Hellman Assumption (SF-DDH): Suppose that $g \in G$ is a random generator of order q. Let L be any polynomial function of $|q|$. Let $O_{\vec{a}}(\bullet)$ be an oracle that, on input a subset $I \subset eq\{1, \ldots, L\}$, outputs the value $g_1{}^{\beta_I}$ where $\beta_I = \pi_{i \in I} a_i$ for some $\vec{a}=(a_1, \ldots, a_L) \in Z_q{}^L$. Further, let R be a predicate such that $R(J,I_1, \ldots, I_t)=1$ if and only if $J \subset \{1, \ldots, L\}$ is DDH-independent from the $I_i$'s; that is, when $\overline{v}(I_i)$ is the L-length vector with a one in position j if and only if $j \in I_i$ and zero otherwise, then there are no three sets $I_a,I_b,I_c$ such that $v(J)+v(I_a)=v(I_b)+v(I_c)$ (where addition is bitwise over the integers).

Then, for all probabilistic polynomial time adversaries $A^{(\cdot)}$, $$\Pr[\vec{a}=(a_1, \ldots, a_L) \leftarrow Z_q{}^L; (J,\alpha) \leftarrow A^{O_{\vec{a}}}(1^{|q|}); y_0 = g^{\pi i \in Ja_i}; y_1 \leftarrow G; b \leftarrow \{0,1\}; b' \leftarrow A^{O_{\vec{a}}}(1^{|q|}, y_b, \alpha): b=b' {}^{\wedge} R(J,Q)=1] < \tfrac{1}{2} + 1/\text{poly}(|q|),$$

where Q is the set of queries that A made to $O_{\vec{a}}(\bullet)$.

Key Building Blocks

1) Known Discrete-Logarithm-Based, Zero-Knowledge Proofs

In the common parameters model, several previously known results for proving statements about discrete logarithms are used, such as (1) proof of knowledge of a discrete logarithm modulo a prime or a composite, (2) proof of knowledge of equality of representation modulo two (possibly different) prime or composite moduli, (3) proof that a commitment opens to the product of two other committed values, (4) proof that a committed value lies in a given integer interval, and also (5) proof of the disjunction or conjunction of any two of the previous. These protocols modulo a composite are secure under the strong RSA assumption and modulo a prime under the discrete logarithm assumption. The Fiat-Shamir heuristic can be applied to turn such proofs of knowledge into signature proofs of knowledge on some message m.

2) CL Signatures

According to the Pedersen commitment scheme the public parameters are a group G of prime order q, and generators $(g_0, \ldots, g_m)$. In order to commit to the values $(v_1, \ldots, v_m) \in Z_q{}^m$, a random $r \in Z_q$ is picked and $C=\text{PedCom}(v_1, \ldots, v_m;r)=g_0{}^r \pi_{i=1}{}^m g_i{}^{v_i}$ is set.

It exists a secure signature scheme with two protocols: (1) An efficient protocol between a user and a signer with keys $(pk_S, sk_S)$. The common input consists of $pk_S$ and C, a Pedersen commitment. The user's secret input is the set of values $(v_1, \ldots, v_l, r)$ such that $C=\text{PedCom}(v_1, \ldots, v_l; r)$. As a result of the protocol, the user obtains a signature $\sigma pk_S(v_1, \ldots, v_l)$ on his committed values, while the signer does not learn anything about them. The signature has size $O(l \log q)$. (2) An efficient proof of knowledge of a signature protocol between a user and a verifier. The common inputs are $pk_S$ and a commitment C. The user's private inputs are the values $(v_1, \ldots, v_l, r)$, and $O_{pk_S}(v_1, \ldots, v_l)$ such that $C=\text{PedCom}(v_1, \ldots, v_l; r)$. These signatures are secure under the strong RSA assumption. For the purposes of this exposition, it does not matter how CL signatures actually work.

The subsequent e-cash system uses the strong RSA assumption independently of the CL signatures. Using bilinear maps, one can use other signature schemes to yield shorter signatures in practice.

3) Verifiable Encryption

In a verifiable encryption scheme, the encrypter/prover convinces a verifier that the plaintext of an encryption under a known public key is equivalent to the value hidden in a Pedersen commitment. In "Jan Camenisch and Ivan Damgard. Verifiable encryption, group encryption, and their applications to group signatures and signature sharing schemes. In Tatsuaki Okamoto, editor, Advances in Cryptology I ASIACRYPT '00, volume 1976 of LNCS, pages 331-345. Springer Verlag, 2000" a technique is described for turning any semantically-secure encryption scheme into a verifiable encryption scheme.

This technique can be used for turning any semantically-secure encryption scheme into a verifiable encryption scheme. A verifiable encryption scheme is a two-party protocol between a prover and encryptor P and a verifier and receiver V.

Roughly, their common inputs are a public encryption key pk and a commitment A. As a result of the protocol, V either rejects or obtains the encryption c of the opening of A. The protocol ensures that V accepts an incorrect encryption only with negligible probability and that V learns nothing meaningful about the opening of A. Together with the corresponding secret key sk, transcript c contains enough information to recover the opening of A efficiently. We hide some details here and refer to Camenisch and Damgard for the full discussion.

4) Bilinear Elgamal Encryption

A cryptosystem where $g^x$ is sufficient for decryption and the public key is $f(g^x)$ for some function $f$ is looked for. In "Dan Boneh and Matthew Franklin. Identity-based encryption from the Weil pairing. In Joe Kilian, editor, Advances in Cryptology I CRYPTO '01, volume 2139 of LNCS, pages 213-229. Springer Verlag, 2001" one example is provided in an identity-based context. Here the bilinear Elgamal encryption scheme of Ateniese et al., which is semantically secure under an assumption implied by Sum-Free DDH is used.

In particular, the verifiable encryption techniques above to the following bilinear variant of Elgamal encryption are applied. Assume one runs Bilinear_Setup on $1^k$ to obtain $\gamma=(q,g_1,h_1,G_1, g_2, h_2, G_2, G_T,e)$, where one has a bilinear map $e:G_1 \times G_2 \rightarrow G_T$. Let (G,E,D) denote the standard key generation, encryption, and decryption algorithms. On input $(1^k,\gamma)$, the key generation algorithm G outputs a key pair (pk,sk)= $(ap(g_1,g_2)^u,g_1^u)$ for a random $u \in Z_q$. The main idea is that the value $g_1^u$ is enough to decrypt.

To encrypt a message $m \in G_T$ under pk, select a random $k \in Z_q$ and output the ciphertext $c=(g_2^k,pk^k m)=(g_2^k, e(g_1,g_2)^{uk}m)$. Then, to decrypt $c=(c_1,c_2)$ with the value $g_1^u$, simply compute $c_2/e(g_1^u,c_1)$. This encryption scheme is known to be semantically-secure under the Decisional Bilinear Diffie-Hellman (DBDH) assumption, i.e., given $(g_2,g_2^a, g_2^b,g_2^c,X)$ for random $a,b,c \in Z_q$ and $X \in G_T$, it is hard to decide if $X=e(g_1,g_2)^{abc}$.

5) DY Pseudorandom Function (PRF)

Let $G=\langle g \rangle$ be a group of prime order q. Let S be a random element of $Z_q$. Dodis and Yampolskiy recently proposed a pseudorandom function $f_{g,s}^{DY}(x)=g^{1/(s+x)}$ for inputs $x \in Z_q^*$. This construction is secure under the y-DDHI. In the construction described above, one could substitute the DY PRF with the Naor-Reingold PRF, and replace the y-DDHI assumption with the more standard DDH assumption, at the cost of enlarging our wallets from O(l+k) bits to O(l→k) bits.

Compact E-Cash in the Bounded-Anonymity Model

As in the CHL compact e-cash scheme, a user withdraws a wallet of 2 coins from the bank and spends them one by one. Also, as in the CHL scheme, a pseudorandom function $F_{(\cdot)}(\cdot)$ is used, whose range is some group G of large prime order q.

At a high level, a user forms a wallet of $2^l$=N coins by picking five values, (x,s,t,v,w) from an appropriate domain to be explained later, and running an appropriate secure protocol with the Bank to obtain the Bank's signature σ on these values.

In the following it is assumed that the user wants to spend coin number i by buying goods from merchant M and that only up to K transactions with this merchant may be anonymous. It is further assumed that this is the user's j-th transaction with M, $j \leq K$. Associated with the i-th coin in the wallet is its serial number $S=F_s(i)$ Associated with the j-th transaction with the merchant M is the merchant's record locator $V=F_v(M,j)$.

According to an embodiment of the invention it is provided that in the Spend protocol, the user should give to the merchant the values (S,V), together with a (non-interactive zero-knowledge) proof that these values are computed as a function of (s,i,v,M,j), where $1 \leq i \leq N$, $1 \leq j \leq K$, and (s,v) correspond to a wallet signed by the Bank. S and V are pseudorandom, and therefore computationally leak no information; and the proof leaks no information because it is zero-knowledge. Suppose that a user spends more than N coins. Then he has used some serial number more than once, since there are only N possible values S of the form $F_s(i)$ where $1 \leq i \leq N$. Similarly, suppose that a user made more than K transactions with M. Then he has used some merchant record locator more than once, since for a fixed M, there are only K different values $V=F_v(M,j)$, $1 \leq j \leq K$. Therefore double-spending and violations of the bounded-anonymity business model can be detected.

In the following it is explained how to provide that using any S or V more than once leads to identification. Besides s and v, the wallet also contains x, t and w. The value $x \in_q$ is such that $g^x$ is a value that can be publicly linked to the user's identity. (Where g is a generator of the group G.) For example, for some computable function $f$, $f(g^x)$ can be the user's public key. Suppose that as part of the transaction the merchant contributes a random value $r \neq 0$, and the user reveals $T=g^x F_t(i)^r$ and $W=g^x F(M,j)^r$, together with a proof that T and W are computed appropriately as a function of (r,x,t,i,w,M,j) corresponding to the very same wallet and the same i and j. Again, T and W are pseudorandom and therefore do not leak any information.

If a user uses the same serial number $S=F_s(i)$ twice, and q is appropriately large, then with high probability in two different transactions she will receive different r's, call them $r_1$ and $r_2$, and so will have to respond with $T_1=g^x F_t(i)^{r_1}$, $T_2=g^x F_t(i)^{r_2}$. It is easy to see that the value $g^x$ can then be computed as follows: $g^x=T_1/(T_1/T_2)^{r_1/(r_1-r_2)}$.

It is shown that it is also the case that if the user uses the same merchant's record locator number V twice, then $g^x$ can be found in exactly the same fashion. Suppose that in the two transactions the merchant used the same r. In that case, the Bank can simply refuse to deposit this e-coin (since it is the same merchant, he is responsible for his own lack of appropriate randomization). If it is supposed that the merchant used two different r's, $r_1$ and $r_2$, giving rise to $W_1$ and $W_2$, it can be seen that $g^x=W_1/(W_1/W_2)^{r_1/(r_1-r_2)}$.

Thus, a double-spending or a violation of the bounded-business model leads to identification. The only remaining question is how this can be adapted to trace other transactions of the same user. $g^x$ is not necessarily a public value, it may also be the case that only $f(g^x)$ is public, while knowledge of $g^x$ gives one the ability to decrypt a cipher text which was formed by verifiably encrypting S (for example, Boneh and Franklin's cryptosystem has the property that $g^x$ is sufficient for decryption). When withdrawing a wallet, the user gives such a cipher text to the bank. In turn, knowledge of S allows to discover serial numbers of all coins from this wallet and see how they were spent.

Finally, the values (x,v,w) should be tied to a user's identity and not to a particular wallet. This way, even if a user tries to spend too much money with a particular merchant from different wallets, it will still lead to detection and identification.

Detailed Description of the Protocol

As the scheme is an extension of the CHL e-cash scheme, the Dodis-Yampolskiy pseudo-random function, i.e., $f_{(g,s)}^{DY}=g^{1/(s+x)}$, is used, where g is the generator of a suitable group; CL-signatures and the related protocols to issue signatures and prove knowledge of signatures; and the Bilinear Elgamal cryptosystem used with the Camenisch-Damgard verifiable encryption techniques.

Notation: Let $F_{(g,s)}(x)=f_{(g,s)}^{DY}(x)$, and when H is a hash function whose range is an appropriate group, let $G_s^H(M,x)=f_{(H(M),s)}^{DY}(x)$.

Now the protocols of the system are described: Setup, Withdraw, Spend, and Deposit (including the protocols in response to violations).

Setup Protocol

Let k be the security parameter. The common system parameters are the bilinear map parameters Bilinear_Setup $(1^k) \rightarrow (q,g_1,G_1,g_2,h_2,G_2,G_T,e)$, a wallet size l, and two hash functions $H_1: \{0,1\}^* \rightarrow G_T$ and $H_2: \{0,1\}^* \rightarrow G_1$. The bank generates CL signing keys $(pk_B,sk_B)$.

Each user generates a key pair of the form $sk_U=(x,v,w)$ and $pk_U=(e(g_1,h_2)^x,e(g_1,h_2)^v,e(g_1,h_2)^w)$, where x, v, and w are chosen randomly from $Z_q$. Each user also generates a signing key pair for any secure signature scheme. Each merchant also publishes a unique identity string $id_M$. Also, an upper-bound $N_M$ for the number of coins each user can spend with merchant $id_M$ is determined.

Withdraw Protocol

A user U withdraws $2^l$ coins from the bank B as follows. The user and the bank engage in an interactive protocol, and if neither reports an error, then at the end:

U obtains $(s,t,\sigma)$, where s,t are random values in $Z_q$, and a is the bank's signature on $(sk_U,s,t)$, i.e., $(x,v,w,s,t)$.

B obtains a verifiable encryption of S under $e(g_1,h_2)^x$, i.e., the first element from the user's public key $pk_U$, together with the user's signature on this encryption.

B does not learn anything about $sk_U$, s, or t.

Step one can be realized using signatures and the related protocols as described in "Jan Camenisch and Anna Lysyanskaya. A signature scheme with ecient protocols. In Stelvio Cimato, Clemente Galdi, and Giuseppe Persiano, editors, Security in Communication Networks '02, volume 2576 of LNCS, pages 268{289. Springer Verlag, 2002". Step two can be realized by applying the Camenisch-Damgard verifiable encryption techniques to the Bilinear Elgamal cryptosystem. Step three follows from the other two. All these steps are essentially the same as in the CHL e-cash scheme, the exception being the secret key signed which now also includes v and w besides x.

Spend Protocol

A user U spends one coin with a merchant M with a spending limit of $N_M$ coins as follows. As in CHL, the user keeps a private counter i from 1 to $2^l$ for the number of coins spent in her wallet. Additionally, the user now also keeps a counter $j_M$ for each merchant M representing the number of coins the user has spent with that merchant.

U checks that it is under her spending limit with merchant M; that is, that $j_M < N_M$. If not, she aborts.

M sends random $r_1, r_2 \in Z_q^*$ to U.

U sends M the i-th coin in her wallet on her $j_M$-th transaction with M.

Recall that $sk_U = (x,v,w)$. This coin consists of a serial number S and a wallet check T, where $$S = F_{(e(g_1,h_2),s)}(i) = e(g_1,h_2)^{1/(s+i)}, \quad T = g_1^x(F_{(g_1,t)}(i))^{r_1} = g_1^{x+r_1/(t+i)}$$

and two money laundering check values V and W, where $$V = G_v^{H_1(id_M,j_M)} = H_1(id_M)^{1/(v+j_M)},$$

$$W = g_1^x(G_w^{H_2(id_M,j_M)})^{r_2} = g_1^x H_2(id_M)^{r_2/(w+j_M)}$$

and a zero-knowledge, proof of knowledge (ZKPOK) $\pi$ of $(i, j_M, sk_U=(x,v,w),s,t,\sigma)$ such that (a) $1 \leq i \leq 2^l$;
(b) $1 \leq j_M \leq N_M$;
(c) $S = F_{(e(g_1,h_2),s)}(i)$, i.e., $S = e(g_1,h_2)^{1/(s+i)}$;
(d) $T = g_1^x(F_{(g_1,t)(i)})^{r_1}$, i.e., $T = g_1^{x+r_1/(t+i)}$;
(e) $V = G_v^{H_1(id_M,j_M)}$, i.e., $V = H_1(id_M)^{1/(v+j_M)}$;
(f) $W = g_1^x(G_w^{H_2(id_M,j_M)})^{r_2}$, i.e., $W = g_1^x H_2(id_M)^{r_2/(w+j_M)}$; and
(g) $VerifySig(pk_B, (sk_U=(x,v,w),s,t),\sigma) = true$.

The proof $\pi$ can be made non-interactive using the Fiat-Shamir heuristic.

If $\pi$ verifies and the value $V_j$ was never seen by M before, then M accepts and saves the coin $(r_1,r_2,S,T,V,W,\pi)$. If the value $V_j$ was previously seen before in a coin $(r_1,r_2,S',T',V,W',\pi')$, then M runs $Open(W',W,r_2,r_2)$. If M executed the Spend protocols honestly (i.e., chose fresh random values at the start of each protocol), then with high probability $r_2 \neq r_2$, and $Open(W',W,r_2,r_2) = g_1^x$. Thus, the merchant can identify the user by computing $e(g_1^x,h_2)$, which is part of U's public key. This allows an honest merchant to protect itself from customers who would try to overspend with it. (If the merchant is dishonest, the bank will catch the overspending at deposit time.)

Steps 3(a, c, d) are the same as in the CHL scheme whereas Steps 3(b, e, f) are new but similar to Steps 3(a, c, d). Finally, Step 3(g) needs to be adapted properly. Consequently, Steps 3(a) and 3(b) can be done using standard techniques. Steps 3(c) to 3(f) can be done using techniques of Camenisch, Hohenberger, and Lysyanskaya as described in "Jan Camenisch, Susan Hohenberger, and Anna Lysyanskaya. Compact E-Cash. In Ronald Cramer, editor, Advances in Cryptology { EUROCRYPT '05, volume 3494 of LNCS, pages 302-321, 2005". Step 3(g) can be done using the Camenisch and Lysyanskaya signatures.

Deposit Protocol

A merchant M deposits a coin with bank B by submitting the coin $(r_1,r_2,S,T,V,W,\pi)$. The bank checks the proof $\pi$; it if does not verify, the bank rejects immediately. Now, the bank makes two additional checks.

First, B checks that the spender of the coin has not overspent her wallet; that is, the bank searches for any previously accepted coin with the same serial number S. Suppose such a coin $(r_1,r_2,S,T',V',W',\pi')$ is found. If $r_1 = r_1$, B refuses to accept the coin. Otherwise, B accepts the coin from the merchant, but now should punish the user who double spent.

B executes $Open(T',T,r_1,r_1) = g_1^x$.

B identifies user as person with public key containing $e(g_1^x,h_2)$.

B uses $g_1^x$ to decrypt the encryption of s left with the bank during the withdraw protocol. Next, B uses s to compute the serial numbers $S_j = F_{(e(g_1,h_2),s)}(i)$ for each coin j=1 to $2^l$ of all coins in the user's wallet. In fact, the bank can use $g_1^x$ to decrypt the secret of all the user's wallets and trace those transactions in the same way.

Second, B checks that the spender of the coin has not exceeded her spending limit with merchant M. That is, the bank searches for any previously accepted coin with the same money-laundering check value $V_j$. Suppose such a coin $(r_1, r_2, S', T', V, W', \pi')$ is found. The bank refuses to accept the deposit and punishes the merchant. The bank now determines if the spender is to blame. If $r_2 = r_2$, B punishes the merchant alone. Otherwise, B may also punish the user who attempted to money launder.

B executes $Open(W',W,r_2,r_2) = g_1^x$.

B identifies user as person with public key containing $e(g_1^x,h_2)$.

B uses $g_1^x$ to decrypt the encryption of s left with the bank during the withdraw protocol. Next, B uses s to compute the serial numbers $S_j = F_{(e(g_1,h_2),s)}(j)$ for each coin j=1 to $2^l$ of all coins in the user's wallet. (In fact, the bank can use $g_1^x$ to decrypt the secret of all the user's wallets and trace those transactions in the same way.)

If all checks pass, B accepts the coin for deposit in M's account.

The deposit protocol is similar to the deposit protocol of the CHL scheme, i.e., instead of only checking for double spending, the bank now also checks for money laundering. Thus, if the user was honest, the bank performs two database lookup's instead of one before.

In the following the Open( ) algorithm is described, which is the same as in the CHL system:

$$Open(W_1, W_2, r_1, r_2) := \frac{W_1}{(W_1/W_2)^{r_1/(r_1-r_2)}}.$$

Thus, if $W_i = g^x F_{(h,s)}(j)^{r_1}$ for some elements $h \in G_1$ and $s, j \in Z_q^*$, we will have $Open(W_1, W_2, r_1, r_2) = g^x$.

In the following it is described how the violation-related protocols work. Let $C_1=(r_1,r_2,S,T,V,W,\pi)$ and $C_2=(r_1,r_2,S',T', V',W',\pi')$ be one existing and one newly deposited coin. Detecting double-spending or money-laundering involves checking $S_1=S_2$ or $V_1=V_2$, respectively. The identification algorithm runs Open on the appropriate inputs, and the resulting proof of guilt is $\pi=(C_1,C_2)$. Verifying the violation entails successfully checking the validity of the coins, detecting the claimed violation, running Open to obtain $g_1^x$, and checking its relation to pk. The leakage of one violation cannot be used to spend the user's coins or fake another violation.) The trace algorithm involves recovering s, from the encryption E signed by the user during Withdraw, and computing all serial numbers. The proof of ownership $\Gamma=(E,\sigma,g_1^x)$, where $\sigma$ is the user's signature on E. Verifying ownership for some serial number S involves verifying the signature $\sigma$, checking that $e(g_1^x,h_2)=pk$, decrypting E to recover s, computing all serial numbers $S_i$, and testing if, for any i, $S=S_i$.

Scaling Back the Punishment for System Violators

To make the punishment for system violators more lenient or simply to make the system more efficient, two other options are available:

Option (1): violation is detected and user's identity is revealed. This system operates as the above except that during the Withdraw protocol the user does not give the bank verifiable encryptions of her wallet secret s. Then later during the Deposit protocol, the bank may still detect the violation and identify the user, but will not be able to compute the serial numbers of other transactions involving this user.

Option (2): violation is detected. This system operates as the Option (1) system, except that during the Spend s protocol, the user does not provide the merchant with the money-laundering check value $Y_j$. Then later during the Deposit protocol, the bank may still detect the violation, but will not be able to identify the user.

Efficiency Considerations

As indication of the protocols efficiency some numbers are stated. For instance, one can construct Spend such that a user has to compute fourteen multi-base exponentiations to build the commitments and twenty more for the proof. In this example, the merchant and bank need to do twenty multi-base exponentiations to check that the coin is valid. The protocols provide two rounds of communication between the user and the merchant and one round between the bank and the merchant. If one takes Option (2) above, then it is thirteen multi-base exponentiations to build the commitments and eighteen more for the proof. Verification by bank and merchant takes eighteen multi-base exponentiations.

Proof of Security

In the bounded-anonymity business model, the scheme achieves correctness, balance, anonymity of users, identification of violators, tracing of violators, and strong exculpability under the Strong RSA, y-DDHI, and either the XDH or Sum-Free DDH assumptions in the random oracle model.

Due to space limitations, some high-level intuitions are provided together with a sketch of the proof. There are three main observations of CHL. They can be extended to prevent violations beyond double-spending, particularly through careful use of the PRF to link its output to a merchant.

Balance: For each wallet, s deterministically defines exactly N values that can be valid serial numbers for coins. To overspend a wallet, a user may use one serial number twice, in which case she is identifiable, or she may forge a CL signature or fake a ZK proof.

Anonymity of users: A coin is comprised of four values (S,T,V,W), which are pseudorandom and thus leak no information about the user, together with a (non-interactive, zero-knowledge) proof of validity, which since it is zero-knowledge also leaks nothing.

The only abnormality here is that, when computing V and W, the base used for the PRF is the hash of the merchant's identity (as opposed to the fixed bases used to compute S and T). Treating hash H as a random oracle, we see that given $G_v^H(id_M,j)$, the output of $G_v^H(\bullet,\bullet)$ on any other input, in particular $G_v^H(id_{M'},j)$ for $id_{M'}\neq id_M$, is indistinguishable from random. Specifically, if an adversary given $G_v^H(id_M,j)=f_{(H(id_M),v)}(j)=H(id_M)^{1/(v+j)}$ can distinguish $H(id_{M'})^{1/(v+j)}$ from random for some random, fixed $H(id_M)$ and $H(id_{M'})$, then it is solving DDH.

Exculpability: First, an honest user cannot be proven guilty of a crime he didn't commit, because the proof of guilt includes the user's secret value $g_1^x$. If a user is honest, only the user knows this value. Second, even a cheating user cannot be proven guilty of a crime he didn't commit—e.g., double-spending one coin does not enable a false proof of money-laundering twenty coins—because: (1) guilt is publicly verifiable from the coins themselves, and (2) knowledge of X is d to create coins. The value $g_1^x$, which is leaked by a violation, is not enough to spend a coin from that user's wallet.

Below a proof is sketched based on the definition outlined above.

Correctness: It can be verified that if honest parties follow the protocols, neither will output an error message.

Balance: Let A be an adversary who executes n Withdraw protocols with an extractor E acting as the bank. During each Withdraw, E acts exactly as an honest bank would, except that when A gives a proof of knowledge of (x,s,t,v,w), E extracts these values. From s, E can compute with a specific probability all legal serial numbers that A can compute for that wallet. Let L denote the set of all serial numbers from all wallets. Now suppose that A can cause an honest bank to accept a coin with serial number $S\notin L$. Then it follows that A has concocted a false proof of validity, which happens with negligible probability.

Anonymity of users: The CHL definition of anonymity provides a simulator S that can successfully execute the user's side of the Spend protocol without access to a user's wallet, secret key, or even the user's public key. Suppose S wishes to spend a coin with merchant M, where the wallet size is N and M's anonymous-spending limit is M. S chooses random values (x,s,t,v,w) and any $1\leq i\leq N$ and $1\leq j_M\leq M$. Next, S creates the coin serial number $S=F_{(e(g_1,h_2),s)}(i)$ merchant record locator $V=G_v^{H_1}(id_M,j_M)$, and check values $T=g_1^x F_{(g_1,t)}(i)^{r_1}$ and $W=g_1^x G_w^{H_1}(id_M,j_M)^{r_2}$ exactly as an honest user would. Because these values are pseudorandom, they are indistinguishable from a real coin. S can prove that (S,T,V,W) are well-formed and that $i,j_M$ are in the appropriate ranges. The only part of the proof that S may fake is that S has a signature from the bank on (x,s,t,v,w). Here, S invokes the appropriate CL simulator for this step, which asks for control of the random oracle.

Identification of violators: As described in balance, an extractor E executes multiple Spend protocols with an adversary A, with high probability, extracting (x,s,t,v,w). For each wallet, E can compute all valid coin serial numbers $S_i=F_{e(g_1,h_2),s}(i)$ for $1\leq i\leq N$ and all valid merchant record locators $V_j=G_v^{H_1}(id_M,j_M)$ for $1\leq j_M\leq M$ and some merchant M. Now suppose that A can cause an honest bank to accept two coins $C_1=(S_1,T_1,V_1,W_1,\pi_1,r_1,r_1)$ and $C_2=(S_2,T_2,V_2,W_2,\pi_2,r_2,r_2)$, with the same serial number $S_1=S_2$ or two coins with the same merchant record locator $V_1=V_2$. For these collisions to happen, the coins come from the same wallet (x,s,t,v,w), with either the same i or the same $(id_M,j_M)$, and be well formed.

Otherwise, the user has faked the proof of validity. With specific probability then, either $g_1^x = T_1/(T_1/T_2)^{r_1/(r_1-r_2)}$ or $g_1^x = W_1/(W_1/W_2)^{r_1/(r_1-r_2)}$, which reveals the user's identity.

The proof of guilt $\pi$ for violation i=1 (double-spending) is valid coins $(C_1,C_2)$. Anyone may check that $S_1=S_2$, $g_1^x = T_1/(T_1/T_2)^{r_1/(r_1-r_2)}$, and $g_1^x$ corresponds to pk (e.g., $f(g_1^x)=pk$). Likewise, the proof of guilt for violation i=2 (exceeding the anonymous-business bound with a particular merchant) is valid coins $(C_1,C_2)$ such that $V_1=V_2$, $g_1^x = W_1/(W_1/W_2)^{r_1/(r_1-r_2)}$, and $g_1^x$ corresponds to pk.

One technicality is what happens if two wallet seeds s,s' are such that $|s-s'|<2^l=N$; thus these wallets overlap in at least one serial number. If the same serial number is spent from both wallets, the bank will flag them as being double-spent, and yet the identification algorithm will not work, because no double-spending has actually occurred. Since this could be confusing for the bank, this problem can be avoided by having the bank contribute randomness to the choice of s for each wallet. When s,s' are drawn at random from $Z_q$, the chance that they overlap is $2^{l+1}/q$.

Tracing of violators: During Withdraw, each user is asked to leave with the bank a verifiable encryption E of her wallet secret s such that her own key $g_1^x$ suffices to decrypt. The user is also asked to sign this encryption. By the identification of violators property, it can be deduced that a system violation allows the bank to recover $g_1^x$. By the integrity of the verifiable encryption, each wallet belonging to the cheating user can be opened, with high probability, using $g_1^x$ to recover the wallet seed s and compute all serial numbers $S_i = F_{(e(g_1,h_2),s)}(i)$ for $1 \leq i \leq N$.

The proof of ownership $\Gamma$ for some coin with serial number S is comprised of the encryption E, the decryption key $g_1^x$, and the signature on E. A verifier should first check that $g_1^x$ corresponds to pk, and that the signature on E is valid. He may then decrypt E to recover s, compute all serial numbers $S_i = F_{(e(g_1,h_2),s)}(i)$ for $1 \leq i \leq N$, and test that, for some i, $S=S_i$.

Strong exculpability: Strong exculpability has two parts. First, that no adversary interacting with an honest user can produce values $(i,S,V,\pi)$ such that VerifyViolation$^{(i)}$(params, S,V,$\pi$) accepts, unless the user with pk is guilty of violation i.

The proof $\pi$ is comprised of two valid coins $(C_1,C_2)$ such that they reveal $g_1^x$. Since $g_1^x$ is secret information, its release signals that the user has committed some violation. The reason the user is at fault for the specific violation at hand (and not some previous one) is that knowledge of x (not simply $g_1^x$) would be needed to create valid coins.

The second part is that no adversary, even after forcing a user to violate a system condition, can produce $(i,S,\Gamma)$ such that VerifyOwnership(params,pk,S,$\Gamma$) unless the coin with serial number S actually belongs to the user with pk. The proof $\Gamma$ is comprised of an encryption E, the user's signature $\sigma$, and a decryption key $g_1^x$. All encryptions signed by the user correspond, with high probability, to some plaintext s that in turn allows to compute all serial numbers belonging to that user. Thus, an adversary would have to forge the user's signature on some new encryption to win, which is considered to happen with negligible probability.

Although the detailed description presented above refers to an electronic payment system, similar problems relating to bounded anonymity can be addressed and solved by the inventive method. In particular, any system granting an emitter a limited number of anonymous accesses to different acceptors on a voucher based system can be implemented based on it. Examples of such systems may comprise, but are not limited too: printer quota systems, electronic voting systems and other e-government services.

In addition to the CHL system, other underlying electronic payment systems can be enhanced in order to prevent electronic money laundering. An example of another electronic payment system, which can be extended in a similar manner, is described in a paper by Stefan Brands titled "Untraceable Off-Line Cash in Wallets with Observers", published in CRYPTO '93, Vol. 773 of LNCS, page 302, 1994.

That which is claimed is:

1. A method for automatically validating a transaction between an issuer having a signing key, an emitter having an emitter key, an acceptor having an unique identity and a limit on transactions and a validator, comprising:

withdrawing a voucher from the issuer by the emitter, the voucher being computed using a first two-party protocol between the issuer and the emitter based on the signing key of the issuer and the emitter key of the emitter, wherein in the step of withdrawing, the emitter provides a proof of knowledge of a wallet secret to the issuer and the voucher is based on the wallet secret;

spending the voucher with the acceptor by the emitter, wherein a money laundering check value is computed using a second two-party protocol between the emitter and the acceptor based on the voucher, a transaction number between the emitter and the acceptor, a transaction challenge value generated by the acceptor and the unique identity of the acceptor, wherein in the step of spending, a proof of knowledge is computed by the emitter and transmitted to the acceptor, a wallet check value is computed and transferred to the acceptor and the acceptor verifies that the transaction number is below the limit on transactions and abandons the transaction, if the transaction number is above the limit on transactions;

depositing the voucher, the transaction challenge value and the money laundering check value with the validator by the acceptor, wherein in the step of depositing, the proof of knowledge computed by the emitter and the wallet check value are deposited with the validator; and validating the transaction by the validator by verifying that the number of transactions between the emitter and the acceptor is below the limit on transactions of the acceptor by comparing the money laundering check value with money laundering check values already deposited with the validator in earlier transactions, wherein the step of validating further comprises:

verifying that the proof of knowledge computed by the emitter is valid with respect to the unique identity of the acceptor, the voucher and the money laundering check value, verifying, by the validator, that the proof was computed based on the limit on transactions of the acceptor; and based on wallet check values of the current and earlier transactions, computing the wallet secret of the emitter by the validator, if the issuer detects that the voucher or the money laundering check value have been deposited with the validator in an earlier transaction and the transaction challenge value of the current transaction is equal to the transaction challenge value used in the earlier transaction;

wherein if the validator detects that a money laundering check value deposited with the validator in an earlier transaction is equal to the money laundering check value of the current transaction, the step of validating further comprises:

rejecting the voucher, retrieving a transaction challenge value and a voucher used in the earlier transaction, and if the transaction challenge value used in the earlier transaction and the transaction challenge value are different, computing, by the validator, an identity of the emitter based on the vouchers used in the earlier and current transaction; and wherein in the step of validating, the validator compares the voucher with a voucher deposited in an earlier transaction, and if the issuer detects that a voucher deposited with the validator in an earlier transaction is equal to the voucher of the current transaction, the step of validating further comprises the steps of:

retrieving the transaction challenge value used in the earlier transaction, if the transaction challenge value used in the earlier transaction and the transaction challenge value are equal, rejecting, by the validator, the voucher, and if the transaction challenge value used in the earlier transaction and the transaction challenge value are different, computing, by the validator, an identity of the emitter based on the vouchers used in the earlier and current transaction.

2. A method for automatically validating a transaction between an issuer having a signing key, an emitter having an emitter key, an acceptor having a unique identity and a limit on transactions and a validator, comprising:

withdrawing a voucher from the issuer by the emitter, the voucher being computed using a first two-party protocol between the issuer and the emitter based on the signing key of the issuer and the emitter key of the emitter;

spending the voucher with the acceptor by the emitter, wherein a money laundering check value is computed using a second two-party protocol between the emitter and the acceptor based on the voucher, a transaction number between the emitter and the acceptor, a transaction challenge value generated by the acceptor and the unique identity of the acceptor;

depositing the voucher, the transaction challenge value and the money laundering check value with the validator by the acceptor; and validating the transaction by the validator by verifying that the number of transactions between the emitter and the acceptor is below the limit on transactions of the acceptor by comparing the money laundering check value with money laundering check values already deposited with the validator in earlier transactions.

3. The method according to claim 2, wherein, in the step of spending, a proof of knowledge is computed by the emitter and transmitted to the acceptor;

in the step of depositing, the proof is deposited with the validator; and the step of validating further comprises verifying that the proof is valid with respect to the unique identity of the acceptor, the voucher and the money laundering check value.

4. The method according to claim 3, wherein: in the step of validating, the validator verifies that the proof was computed based on the limit on transactions of the acceptor.

5. The method according to claim 2, wherein: if the validator detects that a money laundering check value deposited with the validator in an earlier transaction is equal to the money laundering check value of the current transaction, the step of validating further comprises:

rejecting the voucher;

retrieving a transaction challenge value and a voucher used in the earlier transaction; and if the transaction challenge value used in the earlier transaction and the transaction challenge value are different, an identity of the emitter is computed by the validator based on the vouchers used in the earlier and current transaction.

6. The method according to claim 5, wherein:

in the step of withdrawing, the emitter provides a proof of knowledge of a wallet secret to the issuer and the voucher is based on the wallet secret;

in the step of spending, a wallet check value is computed and transferred to the acceptor;

in the step of depositing, the wallet check value is deposited with the validator; and in the step of validating, based on wallet check values of the current and earlier transactions, the wallet secret of the emitter is computed by the validator, if the issuer detects that the voucher or the money laundering check value have been deposited with the validator in an earlier transaction and the transaction challenge value of the current transaction is equal to the transaction challenge value used in the earlier transaction.

7. The method according to claim 2, wherein:

in the step of validating, the validator compares the voucher with a voucher deposited in an earlier transaction; and if the issuer detects that a voucher deposited with the validator in an earlier transaction is equal to the voucher of the current transaction, the step of validating further comprises the steps of:

retrieving the transaction challenge value used in the earlier transaction;

if the transaction challenge value used in the earlier transaction and the transaction challenge value are equal, the voucher is rejected by the validator; and if the transaction challenge value used in the earlier transaction and the transaction challenge value are different, an identity of the emitter is computed by the validator based on the vouchers used in the earlier and current transaction.

8. The method according to claim 2, wherein in the step of spending, the acceptor verifies that the transaction number is below the limit on transactions and abandons the transaction, if the transaction number is above the limit on transactions.

9. An electronic payment system comprising:

a bank computer system for issuing coins of a predetermined denomination, the bank computer system including a signing key;

a user computer system for emitting the coins, a merchant computer system for accepting the coins, the user computer system including an emitter key;

an acceptor computer system including a unique identity and a limit on transactions; and a validator computer system for validating the coins, a data network connecting the bank computer system, the user computer system, the merchant computer system and the validator computer system; and wherein the electronic payment system configured to:

withdraw a voucher from the bank computer system by the user computer system, the voucher being computed using a first two-party protocol between the bank computer system and the user computer system based on the signing key of the bank computer system and the emitter key of the user computer system;

spend the voucher with the acceptor by the user computer system, wherein a money laundering check value is computed using a second two-party protocol between the user computer system and the acceptor computer system based on the voucher, a transaction number between the user computer system and the acceptor computer system, a transaction challenge value generated by the acceptor computer system and the unique identity of the acceptor computer system;

deposit the voucher, the transaction challenge value and the money laundering check value with the validator computer system by the acceptor computer system; and validate the transaction by the validator computer system by verifying that the number of transactions between the user computer system and the acceptor computer system is below the limit on transactions of the acceptor computer system by comparing the money laundering check value with money laundering check values already deposited with the validator computer system in earlier transactions.

10. A computer program product embodied in computer readable medium for automatically validating a transaction between an issuer having a signing key, an emitter having an emitter key, an acceptor having an unique identity and a limit on transactions, and a validator, the computer program product comprising program instructions executable by at least one processor of a computer system, the program instructions including instructions for:

withdrawing a voucher from the issuer by the emitter, the voucher being computed using a first two-party protocol between the issuer and the emitter based on the signing key of the issuer and the emitter key of the emitter;

spending the voucher with the acceptor by the emitter, wherein a money laundering check value is computed using a second two-party protocol between the emitter and the acceptor based on the voucher, a transaction number between the emitter and the acceptor, a transaction challenge value generated by the acceptor and the unique identity of the acceptor;

depositing the voucher, the transaction challenge value and the money laundering check value with the validator by the acceptor; and validating the transaction by the validator by verifying that the number of transactions between the emitter and the acceptor is below the limit on transactions of the acceptor by comparing the money laundering check value with money laundering check values already deposited with the validator in earlier transactions.

11. The computer program product according to claim 10, wherein, the program instructions for spending includes program instructions for computing a proof of knowledge by the emitter and transmitted to the acceptor;

the program instructions for depositing include program instructions for depositing the proof with the validator; and the program instructions for validating further comprises program instructions for verifying that the proof is valid with respect to the unique identity of the acceptor, the voucher and the money laundering check value.

12. The computer program product according to claim 11, wherein:

the program instructions for validating include program instructions for verifying by the validator that the proof was computed based on the limit on transactions of the acceptor.

13. The computer program product according to claim 10, wherein:

if the validator detects that a money laundering check value deposited with the validator in an earlier transaction is equal to the money laundering check value of the current transaction, the program instructions for validating further program instructions for:

rejecting the voucher;

retrieving a transaction challenge value and a voucher used in the earlier transaction; and if the transaction challenge value used in the earlier transaction and the transaction challenge value are different, computing an identity of the emitter by the validator based on the vouchers used in the earlier and current transaction.

14. The computer program product according to claim 10, wherein:

program instructions for validating includes program instructions for comparing by the validator the voucher with a voucher deposited in an earlier transaction; and if the issuer detects that a voucher deposited with the validator in an earlier transaction is equal to the voucher of the current transaction, the program instructions for validating further comprise program instructions for:

retrieving the transaction challenge value used in the earlier transaction;

if the transaction challenge value used in the earlier transaction and the transaction challenge value are equal, the voucher is rejected by the validator; and if the transaction challenge value used in the earlier transaction and the transaction challenge value are different, an identity of the emitter is computed by the validator based on the vouchers used in the earlier and current transaction.

15. The computer program product according to claim 14, wherein:

the program instructions for withdrawing include program instructions for providing by the emitter a proof of knowledge of a wallet secret to the issuer and the voucher is based on the wallet secret;

the program instructions for spending include program instructions for computing and transferring a wallet check value to the acceptor;

the program instructions for depositing include program instructions for depositing the wallet check value with the validator; and the program instructions for validating include program instructions for computing, based on wallet check values of the current and earlier transactions, the wallet secret of the emitter by the validator, if the issuer detects that the voucher or the money laundering check value have been deposited with the validator in an earlier transaction and the transaction challenge value of the current transaction is equal to the transaction challenge value used in the earlier transaction.

16. The computer program product according to claim 10, wherein the program instructions for spending include program instructions for verifying by the acceptor that the transaction number is below the limit on transactions and abandons the transaction, if the transaction number is above the limit on transactions.

17. An issuer for issuing a voucher, in particular a coin, to an emitter, the issuer computing the voucher using a first two-party protocol between the issuer and the emitter based on a signing key of the issuer and an emitter key of the emitter.

18. An acceptor for accepting vouchers, in particular coins, from an emitter, the vouchers being computed using a first two-party protocol between an issuer and the emitter based on a signing key of the issuer and an emitter key of the emitter, the acceptor being provided for computing a money laundering check value by using a second two-party protocol between the emitter and the acceptor based on the voucher, a transaction number between the emitter and the acceptor, a transaction challenge value generated by the acceptor and the unique identity of the acceptor; and depositing the voucher, the transaction challenge value and the money laundering check value with a validator.

19. A validator for validating transactions between an issuer having a signing key, an emitter having an emitter key, an acceptor having an unique identity and a limit on transactions, the validator being provided for:

verifying that the number of transactions between the emitter and the acceptor is below the limit on transactions of the acceptor by comparing a money laundering check value with money laundering check values already deposited with the validator in earlier transactions.

20. An emitter provided for:

withdrawing a voucher from an issuer, the voucher being computed using a first two-party protocol between the issuer and the emitter based on a signing key of the issuer and an emitter key of the emitter;

spending the voucher with an acceptor, wherein a money laundering check value is computed using a second two-party protocol between the emitter and the acceptor based on the voucher, a transaction number between the emitter and the acceptor, a transaction challenge value generated by the acceptor and a unique identity of the acceptor.

* * * * *